US007303607B2

(12) United States Patent
Tempel et al.

(10) Patent No.: US 7,303,607 B2
(45) **Date of Patent: *Dec. 4, 2007**

(54) LIQUID MEDIA CONTAINING LEWIS ACIDIC REACTIVE COMPOUNDS FOR STORAGE AND DELIVERY OF LEWIS BASIC GASES

(75) Inventors: Daniel Joseph Tempel, Macungie, PA (US); Philip Bruce Henderson, Allentown, PA (US); Jeffrey Richard Brzozowski, Kunkletown, PA (US); Ronald Martin Pearlstein, Macungie, PA (US); Thomas Richard Gaffney, Carlsbad, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 509 days.

This patent is subject to a terminal disclaimer.

(21) Appl. No.: 10/867,068

(22) Filed: Jun. 14, 2004

(65) Prior Publication Data

US 2005/0276733 A1 Dec. 15, 2005

(51) Int. Cl.
*F17C 11/00* (2006.01)
*B01D 19/00* (2006.01)

(52) U.S. Cl. ............................................ 95/241; 222/3

(58) Field of Classification Search ................. 95/149, 95/232-235, 241; 96/108, 155, 243; 423/210; 422/129; 206/0.6, 0.7; 222/3; 252/181.3, 252/183.11

See application file for complete search history.

(56) References Cited

U.S. PATENT DOCUMENTS 4,668,255 A 5/1987 Govind
4,713,091 A 12/1987 Govind
4,744,221 A 5/1988 Knollmueller
4,761,164 A * 8/1988 Pez et al. ...................... 95/44
5,473,904 A * 12/1995 Guo et al. .................. 62/46.1
5,518,528 A 5/1996 Tom et al.
5,704,965 A 1/1998 Tom et al.
5,993,766 A 11/1999 Tom et al.
6,267,229 B1 7/2001 Heung
6,277,342 B1 8/2001 Pearlstein et al.
6,339,182 B1 1/2002 Munson
6,500,238 B1 12/2002 Brandes et al.
6,623,659 B2 9/2003 Munson et al.
7,208,605 B2 * 4/2007 Davis, Jr. .................. 548/110
2002/0055242 A1 5/2002 Uhlenbrock et al.
2003/0125599 A1 7/2003 Boudreau et al.

FOREIGN PATENT DOCUMENTS

EP 740104 A2 * 10/1996
EP 1 486 458 A2 12/2004
WO WO 97/36819 10/1997
WO WO 01/40150 A1 6/2001
WO WO 02/34863 A1 5/2002

* cited by examiner

*Primary Examiner*—Frank M. Lawrence
(74) *Attorney, Agent, or Firm*—Lina Yang; Geoffrey L. Chase

(57) ABSTRACT

This invention relates to an improvement in a low-pressure storage and delivery system for gases having Lewis basicity, particularly hazardous specialty gases such as phosphine and arsine, which are utilized in the electronics industry. The improvement resides in storing the gases in a liquid incorporating a reactive compound having Lewis acidity capable of effecting a reversible reaction between a gas having Lewis basicity. The reactive compound comprises a reactive species that is dissolved, suspended, dispersed, or otherwise mixed with a nonvolatile liquid.

24 Claims, 1 Drawing Sheet

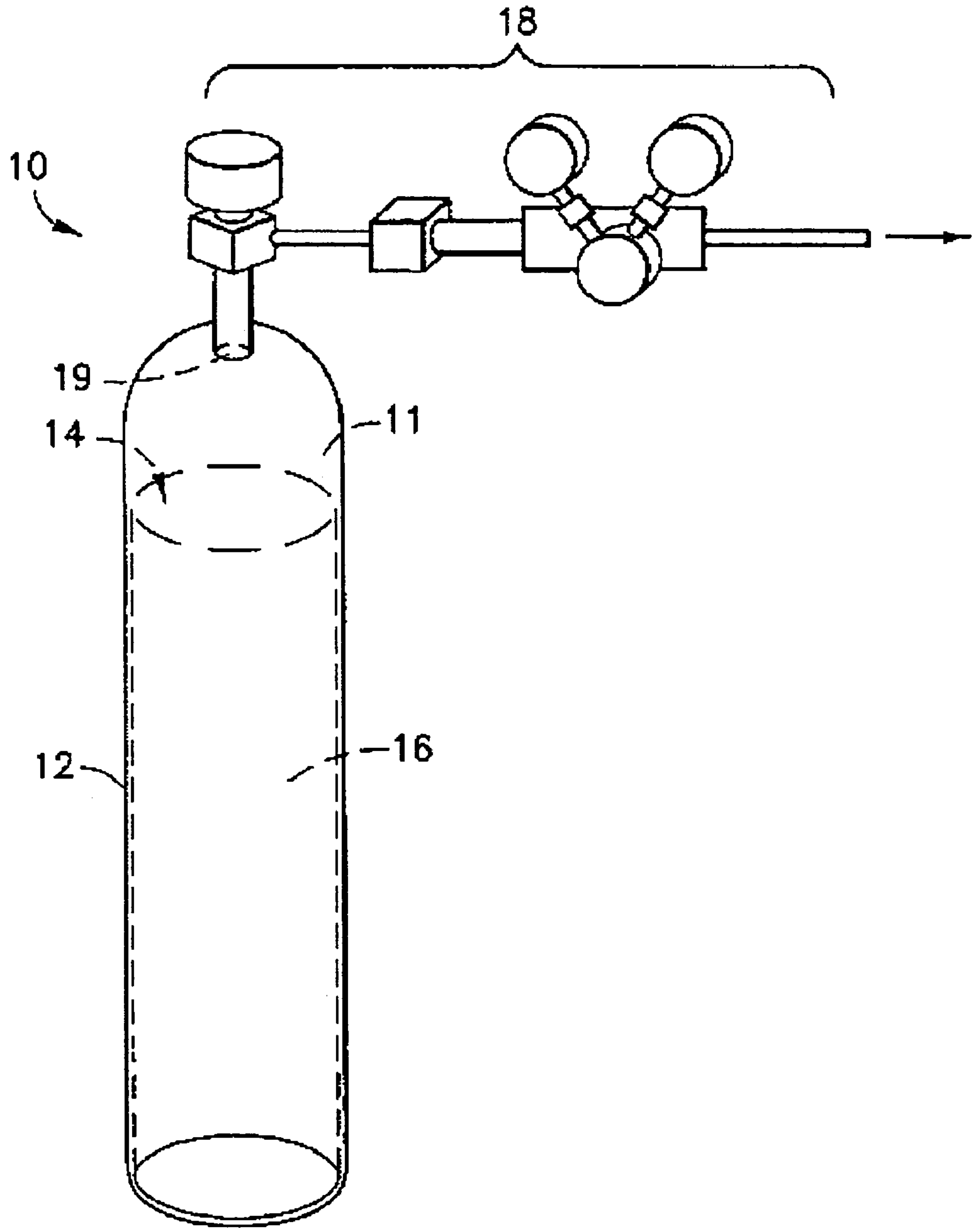
18
10
19
14
11
12
16

LIQUID MEDIA CONTAINING LEWIS ACIDIC REACTIVE COMPOUNDS FOR STORAGE AND DELIVERY OF LEWIS BASIC GASES

BACKGROUND OF THE INVENTION

Many processes in the semiconductor industry require a reliable source of process gases for a wide variety of applications. Often these gases are stored in cylinders or vessels and then delivered to the process under controlled conditions from the cylinder. The semiconductor manufacturing industry, for example, uses a number of hazardous specialty gases such as phosphine, arsine, and boron trifluoride for doping, etching, and thin-film deposition. These gases pose significant safety and environmental challenges due to their high toxicity and pyrophoricity (spontaneous flammability in air). In addition to the toxicity factor, many of these gases are compressed and liquefied for storage in cylinders under high pressure. Storage of toxic gases under high pressure in metal cylinders is often unacceptable because of the possibility of developing a leak or catastrophic rupture of the cylinder.

In order to mitigate some of these safety issues associated with high pressure cylinders, on-site electrochemical generation of such gases has been used. Because of difficulties in the on-site synthesis of the gases, a more recent technique of low pressure storage and delivery systems has been to adsorb these gases onto a solid support. These storage and delivery systems are not without their problems. They suffer from poor capacity and delivery limitations, poor thermal conductivity, and so forth.

The following patents and articles are illustrative of low pressure, low flow rate gas storage, and delivery systems.

U.S. Pat. No. 4,744,221 discloses the adsorption of $AsH_3$ onto a zeolite. When desired, at least a portion of the $AsH_3$ is released from the delivery system by heating the zeolite to a temperature of not greater than about 175° C. Because a substantial amount of $AsH_3$ in the container is bound to the zeolite, the effects of an unintended release due to rupture or failure are minimized relative to pressurized containers.

U.S. Pat. No. 4,668,255 and U.S. Pat. No. 4,713,091 disclose the use of manganese II complexes having the general formula $Mn(II)LX_2$, where L is a ligand, which includes an amine or diphosphine group, and is sensitive to oxygen, nitrogen oxides, sulphur dioxide, carbon dioxide, lower alkenes and other gases and X is an anion, e.g., $Cl^-$, $Br^-$, $OH^-$ and the like. The compound can be carried on a support or dissolved in a liquid solvent.

U.S. Pat. No. 6,623,659, U.S. Pat. No. 6,339,182 and U.S. 2003\0125599 disclose the separation of olefins from paraffins and di-olefins from mono-olefins using an olefin complexing metal salt dispersed in an ionic liquid. Preferred salts are Group IB salts, preferably silver salts, e.g., silver tetrafluoroborate.

U.S. Pat. No. 5,518,528 discloses storage and delivery systems based on physical sorbents for storing and delivering hydride, halide, and organometallic Group V gaseous compounds at sub-atmospheric pressures. Gas is desorbed by dispensing it to a process or apparatus operating at lower pressure.

U.S. Pat. No. 5,704,965 discloses sorbents for use in storage and delivery systems where the sorbents may be treated, reacted, or functionalized with chemical moieties to facilitate or enhance adsorption or desorption of fluids. Examples include the storage of hydride gases such as arsine on a carbon sorbent.

U.S. Pat. No. 5,993,766 discloses physical sorbents, e.g., zeolites and carbon, for sub-atmospheric storage and dispensing of fluids in which the sorbent can be chemically modified to affect its interaction with selected fluids. For example, a sorbent material may be functionalized with a Lewis basic amine group to enhance its sorbtive affinity for $B_2H_6$ (sorbed as $BH_3$).

U.S. Pat. No. 6,277,342 discloses a method for delivering Brønsted basic gases via reversibly protonating the gases using at least one polymer support bearing acid groups. The resulting salt formed from the acid/base reaction becomes sorbed to the polymer support.

BRIEF SUMMARY OF THE INVENTION

This invention relates generally to an improvement in low pressure storage and dispensing systems for the selective storing of gases and the subsequent dispensing of said gases, generally at pressures of 5 psig and below, typically at subatmospheric pressures, e.g., generally below 760 Torr, by pressure differential, heating, or a combination of both. The improvement resides in storing gases having Lewis basicity in a reversibly reacted state in a liquid containing a reactive compound having Lewis acidity.

Several advantages for achieving safe storage, transportation, and delivery of gases having Lewis basicity. These include:

- an ability to maintain a reliable source of these gases in a liquid medium wherein the gases are maintained near or below atmospheric pressure during shipping and storage;
- an ability to store and deliver gases in essentially pure form;
- an ability to manage the problems associated with the transfer of heat during gas loading and dispensing;
- an ability to allow for mechanical agitation and pumping, thereby making operations such as compound transfer more efficient;
- an ability to optimize the binding affinity for a given gas through choice of reactive component; and,
- an ability to obtain high gas (or working) capacities compared to the surface adsorption and chemisorption approaches associated with solid adsorbents.

BRIEF DESCRIPTION OF SEVERAL VIEWS OF THE DRAWING

The FIGURE is a schematic perspective representation of a storage and dispensing vessel with associated flow circuitry for the storage and dispensing of gases such as phosphine and arsine.

DETAILED DESCRIPTION OF THE INVENTION

This invention relates to an improvement in a low-pressure storage and delivery system for gases, particularly hazardous specialty gases such as phosphine and arsine, which are utilized in the electronics industry. The improvement resides in storing of gases having Lewis basicity in a liquid incorporating a reactive compound having Lewis acidity capable of effecting a reversible reaction between the gas having Lewis basicity. The reactive compound comprises a reactive species that is dissolved, suspended, dispersed, or otherwise mixed with a nonvolatile liquid.

The system for storage and dispensing of a gas comprises a storage and dispensing vessel constructed and arranged to hold a liquid incorporating a reactive compound having an affinity for the gas to be stored, and for selectively flowing such gas into and out of such vessel. A dispensing assembly is coupled in gas flow communication with the storage and dispensing vessel, and it is constructed and arranged for selective, on-demand dispensing of the gas having Lewis basicity, by thermal and/or pressure differential-mediated evolution from the liquid mixture. The dispensing assembly is constructed and arranged:

(i) to provide, exteriorly of said storage and dispensing vessel, a pressure below said interior pressure, to effect evolution of the gas from the reactive compound contained in the liquid, and flow of gas from the vessel through the dispensing assembly; and/or (ii) to provide means for removal of heat of reaction of the gas with the liquid medium containing the reactive compound and for heating the liquid mixture to effect evolution of the gas therefrom, so that the gas flows from the vessel through the dispensing assembly.

Thus, the invention relates to a system for the storage and delivery of a gas having Lewis basicity, comprising a storage and dispensing vessel containing a liquid incorporating a reactive compound having Lewis acidity and having a readily reversible reactive affinity for the gas having Lewis basicity.

To facilitate an understanding of the storage and delivery system in terms of the general description above, reference is made to the FIGURE. The storage and dispensing system 10 comprises storage and dispensing vessel 12 such as a conventional gas cylinder container of elongate character. In the interior volume 14 of such vessel is disposed a liquid 16 capable of carrying a reactive compound (not shown) therein with the gas to be stored. The vessel 12 is provided at its upper end with a conventional cylinder head gas dispensing assembly 18, which includes valves, regulators, etc., coupled with the main body of the cylinder 12 at the port 19. Port 19 allows gas flow from the reactive compound and then from the liquid medium retained in the cylinder into the dispensing assembly 18. Optionally, the vessel can be equipped with an on/off valve and the regulator provided at the site for delivery.

The storage and delivery vessel 12 may be provided with internal heating means (not shown) which serves to thermally assist in shifting the equilibrium such that the gas bonded to the reactive compound, and sometimes the liquid carrier, is released. Often, the gas stored in the reactive compound is at least partially, and most preferably, fully dispensed from the storage and dispensing vessel containing the gas by pressure-mediated evolution. Such pressure differential may be established by flow communication between the storage and dispensing vessel, on the one hand, and a vacuum or low pressure ion implantation chamber, on the other. The storage and delivery vessel 12 may also be provided with a means of agitation (not shown) which serves to enhance the rate of gas diffusion from the reactive compound and liquid medium.

The storage and delivery vessel 12 may be used as the reactor itself in that a liquid medium containing the reactive compound can be transferred into the vessel and the gas subsequently added under conditions for forming the reaction complex in situ within the vessel. The reactive complex comprised of the reactive compound and gas can also be formed external to the storage and delivery system and transferred into the storage vessel 12.

A feature of the invention is that the gas is readily removable from the reactive compound contained in the liquid medium by pressure-mediated and/or thermally-mediated methods. By pressure-mediated removal it is meant that removal which can be effected by a change in pressure conditions, which typically range from $10^{-1}$ to $10^{-7}$ Torr at 25° C., to cause the gas to be released from the reactive compound and evolve from the liquid carrying the reactive compound. For example, such pressure conditions may involve the establishment of a pressure differential between the liquid incorporating the reactive compound in the vessel, and the exterior environment of the vessel, which causes flow of the fluid from the vessel to the exterior environment (e.g. through a manifold, piping, conduit or other flow region or passage). The pressure conditions effecting removal may involve the imposition on the contents within the vessel under vacuum or suction conditions which effect extraction of the gas from the reactive mixture and thus from the vessel.

By thermally-mediated removal it is meant that removal of the gas can be achieved by heating the contents in the vessel sufficiently to cause the evolution of the gas bonded with the reactive compound so that the gas can be withdrawn or discharged from the liquid medium and thus from the vessel. Typically, the temperature for thermal mediated removal or evolution ranges from 30° C. to 150° C. Because the reactant is a compound carried in a liquid medium, as opposed to a porous solid medium employed in the prior art processes, thermally-mediated evolution can be utilized, if desired.

A suitable liquid carrier for the reactive compound has low volatility and preferably has a vapor pressure below about $10^{-2}$ Torr at 25° C. and, more preferably, below $10^{-4}$ Torr at 25° C. In this way, the gas to be evolved from the liquid medium can be delivered in substantially pure form and without substantial contamination from the liquid solvent or carrier. Liquids with a vapor pressure higher than $10^{-2}$ Torr may be used if contamination can be tolerated. If not, a scrubbing apparatus may be required to be installed between the liquid mixture and process equipment. In this way, the liquid can be scavenged to prevent it from contaminating the gas being delivered. Ionic liquids have low melting points (i.e. typically below room temperature) and high boiling points (i.e. typically above 250° C. at atmospheric pressure) which make them well suited as solvents or carriers for the reactive compounds.

Ionic liquids can be acid/base neutral or they can act as a reactive liquid, i.e., as a Lewis acid, for effecting reversible reaction with the gas to be stored. These reactive ionic liquids have a cation component and an anion component. The acidity or basicity of the reactive ionic liquids then is governed by the strength of the cation, the anion, or by the combination of the cation and anion. The most common ionic liquids comprise salts of tetraalkylphosphonium, tetraalkylammonium, N-alkylpyridinium or N,N'-dialkylimidazolium cations. Common cations contain $C_{1-18}$ alkyl groups, and include the ethyl, butyl and hexyl derivatives of N-alkyl-N'-methylimidazolium and N-alkylpyridinium. Other cations include pyridazinium, pyrimidinium, pyrazinium, pyrazolium, triazolium, thiazolium, and oxazolium.

Also known are "task-specific" ionic liquids bearing reactive functional groups on the cation, and these ionic liquids can be used here. Task specific ionic liquids often are aminoalkyl, such as aminopropyl; ureidopropyl, and thioureido derivatives of the above cations. Specific examples of task-specific ionic liquids containing functionalized cations include salts of 1-alkyl-3-(3-aminopropyl)imidazolium, 1-alkyl-3-(3-ureidopropyl)imidazolium, 1-alkyl-3-(3-thioureidopropyl)imidazolium, 1-alkyl-4-(2-diphenylphosphanylethyl)pyridinium, 1-alkyl-3-(3-sulfopropyl)imidazolium, and trialkyl-(3-sulfopropyl)phosphonium.

A wide variety of anions can be matched with the cation component of such ionic liquids for achieving a neutral ionic liquid or one that possesses Lewis acidity or Lewis basicity. One type of anion is derived from a metal halide. The halide most often used is chloride although the other halides may also be used. Preferred metals for supplying the anion component, e.g., the metal halide, include copper, aluminum, iron, cobalt, chromium, zinc, tin, antimony, titanium, niobium, tantalum, gallium, and indium. Examples of metal chloride anions are $CuCl_2^-$, $Cu_2Cl_3^-$, $AlCl_4^-$, $Al_2Cl_7^-$, $CoCl_3^-$, $CrCl_4^-$, $ZnCl_3^-$, $ZnCl_4^{2-}$, $Zn_2Cl_5^-$, $FeCl_3^-$, $FeCl_4^-$, $Fe_2Cl_7^-$, $TiCl_5^-$, $TiCl_6^{2-}$, $SnCl_5^-$, $SnCl_6^{2-}$, etc.

Other commonly used anions include carboxylates, fluorinated carboxylates, sulfonates, fluorinated sulfonates, imides, borates, phosphates, chloride, etc. Preferred anions include $BF_4^-$, $PF_6^-$, p-$CH_3$—$C_6H_4SO_3^-$, $CF_3SO_3^-$, $CH_3OSO_3^-$, $CH_3CH_2OSO_3^-$, $(CF_3SO_2)_2N^-$, $(NC)_2N^-$ $(CF_3SO_2)_3C^-$, $CH_3COO^-$ and $CF_3COO^-$.

Examples of halide ionic liquid compounds from which other ionic liquids can be prepared include:

1-ethyl-3-methylimidazolium bromide; 1-ethyl-3-methylimidazolium chloride; 1-butyl-3-methylimidazolium bromide; 1-butyl-3-methylimidazolium chloride; 1-hexyl-3-methylimidazolium bromide; 1-hexyl-3-methylimidazolium chloride; 1-methyl-3-octylimidazolium bromide; 1-methyl-3-octylimidazolium chloride; monomethylamine hydrochloride; trimethylamine hydrochloride; tetraethylammonium chloride; tetramethyl guanidine hydrochloride; N-methylpyridinium chloride; N-butyl-4-methylpyridinium bromide; N-butyl-4-methylpyridinium chloride; tetrabutylphosphonium chloride; and tetrabutylphosphonium bromide.

Other suitable liquid carriers include oligomers and low molecular weight polymers, hyperbranched and dendritic amorphous polymers, natural and synthetic oils, etc. Specific examples of suitable liquid carriers include alkylene carbonates, glymes, polyether oils, perfluoropolyether oils, chlorotrifluoroethylene oils, hydrofluorocarbon oils, polyphenyl ether, silicone oils, fluorosilicone oils, hydrocarbon (refined petroleum) oils, hyperbranched polyethylene, hyperbranched polyether, polyester polyols, polyether polyols, polycarbonates, etc. Some of these liquids suffer from excessive volatility at elevated temperatures, in which case they are not suited for thermal-mediated evolution. However, they may be suited for pressure-mediated evolution.

A suitable reactive compound for reversibly reacting with the gas to be stored and subsequently delivered therefrom must also have low volatility and preferably has a vapor pressure below about $10^{-2}$ Torr at 25° C. and, more preferably, below $10^{-4}$ Torr at 25° C. In this way, the gas to be evolved from the reactive compound and the liquid medium can be delivered in substantially pure form and without substantial contamination from the reactive species. Compounds with a vapor pressure higher than $10^{-2}$ Torr may be used if contamination can be tolerated. If not, a scrubbing apparatus may be required to be installed between the storage vessel and process equipment. In this way, the reactive compound can be scavenged to prevent it from contaminating the gas being delivered.

Reactive compounds can be derived from compounds of the empirical formula:

$$M_aL_bX_cY_d$$

where M represents one or more metals typically selected from the group consisting of alkaline earth (IUPAC Group 2), transition (IUPAC Group 3 through 11) or other (IUPAC Group 12 through 15) metals; L is a neutral donor ligand, which may be monodentate or multidentate, X represents an anion that is either covalently bound to a metal or that dissociates to form a counterion to a metal cation, and which may be combined with at least one donor ligand, L and/or cation Y; Y represents a cation that dissociates to form a counterion to a metal anion, and which may be combined with at least one donor ligand, L and/or anion, X. Anions, X, and cations, Y, may carry a single charge or multiple charges (e.g., a dianion or dication). Certain metals, e.g. IUPAC Group 3, 13 and 15 metals, may comprise M, L, X, or Y in the formula (see below).

The metals are selected from those which form chemical complexes with $PH_3$, $AsH_3$, and other Lewis bases, e.g., Cu, Ag, Al, B, Sn, Ti, Zn, Fe, Ni, Pd, Pt, Mn, Ca, Ga, As, Sb, In, Nb, Mg, Sc, Zr, Co, Ru, and V.

Examples of neutral donor ligands, L, are those having a lone pair of electrons to donate and are commonly based on nitrogen, oxygen, phosphorous, sulfur, and unsaturated hydrocarbons. General classes include amines, imines, nitriles, phosphines, phosphites, ethers, aldehyes, ketones thioethers, olefins, diolefins, aromatics, etc. Examples include $NH_3$, $RNH_2$, $R_2NH$, $NR_3$, $R_2C{=}N{-}R$, $N{\equiv}CR$, $PH_3$, $RPH_2$, $R_2PH$, $PR_3$, $P(OR)_3$, $OR_2$, $SR_2$, CO, RCH(O), $R_2C{=}O$, cyclooctadiene, and benzene, where R is alkyl, cycloalkyl, aryl, alkoxy, aryloxy, haloalkyl, haloalkoxy, a polymer, etc. R may incorporate additional neutral donor groups or ionic groups.

Anions, X, include organic and inorganic groups that bear a negative charge. General classes of anions include halides, alkyls, alkoxides, aryls, aryloxides, alkylates, cyclopentadienyls, acetylacetonoates, amides, sulfonates, sulfates, borates, aluminates, aluminoxides, phosphates, arsenates, etc. Examples include $F^-$, Cl, $Br^-$, $I^-$, $R^-$, $RO^-$, cyclopentadienyl (Cp), pentamethylcyclopentadienyl, $R_2N^-$, acetylacetonoate (acac), hexafluoroacetylacetonoate (hfac), $CF_3SO_2O^-$ ($^-$OTf), $RSO_2O^-$, $ROSO_2O^-$, $BF_4^-$, $BR_4^-$, $AlCl_4^-$, $PF_6^-$, $PR_3F_3^-$, $AsF_6^-$, $NO_3^-$, $SO_4^-$, where R is alkyl, cycloalkyl, aryl, alkoxy, aryloxy, haloalkyl, haloalkoxy, a polymer etc. R may incorporate additional neutral donor or ionic groups.

Cations, Y, include organic and inorganic groups that bear a positive charge. Examples include $Na^+$, $K^+$, $Li^+$, $Ca^{2+}$, $Ba^{2+}$, $NH_4^+$, $R_3NH^+$, $NR_4^+$, $R_3PH^+$, $PR_4$+, N-alkylpyridinium, N,N'-dialkylimidazolium, pyridazinium, pyrimidinium, pyrazinium, pyrazolium, triazolium, thiazolium, oxazolium, etc, where R is typically alkyl. R may incorporate additional neutral donor or ionic groups.

Examples of Lewis acidic metal compounds with the formula MX include AgCl, AgBr, AgI, $Ag(BF_4)$, Ag(OTf), $Ag(NO_3)$, CuCl, CuBr, CuI, CuCN, Cu(OTf), $Cu(PF_6)$, $Cu(AsF_6)$, Cu(acac), $Cu(O_2CCH_3)$, $Cu(O_2CCF_3)$, and $Cu[N(SO_2CF_3)_2]$.

Examples of Lewis acidic compounds with the formula $MX_2$ include $CuCl_2$, $Cu(BF_4)_2$, $Cu(OTf)_2$, $SnCl_2$, $ZnCl_2$, $NiCl_2$, $MgCl_2$, $Mg(CH_2SCH_3)_2$, $CaCl_2$, $MnCl_2$, $Ca(OTf)_2$, $PdCl_2$, $Pd(CN)_2$, $(Cp)_2Os$, and $(Cp)_2Ru$.

Examples of Lewis acidic compounds with the formula $MX_3$ include $AlCl_3$, $Al(OTf)_3$, $FeCl_3$, $GaCl_3$, $SbCl_3$, $InCl_3$, $La(OTf)_3$, $Sc(OTf)_3$, $Ln(OTf)_3$, $Yb(OTf)_3$, tributylborane, tributylborate, and tris(perfluorophenyl)borane.

Examples of Lewis acidic compounds with the formula $MX_4$ or $MX_5$ include $SnCl_4$, $TiCl_4$, $ZrCl_4$, $PtCl_4$, $PtI_4$, $SbCl_5$, $NbCl_5$ and titanium compounds $TiCl_3$(4-nitrophenoxide); $TiCl_3(OCH_2CH_3)$, $TiCl_3(OCH_2CF_3)$, $TiCl_2(OCH_2CF_3)_2$, $TiCl_3(OCH(CF_3)_2)$, (Pentafluorocyclopentadienyl)$TiCl_3$, $TiCl_3$(phenoxide), and $TiCl_3$(pentafluorophenoxide).

Other examples of Lewis acidic metal compounds include $TiCl_3$(2-phenyliminomethyl-phenoxide), $TiCl_3$(2-[(2,6-diisopropylphenylimino)-methyl]phenoxide, $TiCl_3$(4-Nitro-2-phenyliminomethylphenoxide) [$MLX_4$]; bis(dibenzylideneacetone)Pd and bis(cyclooctadiene)Pd [$ML_2$]; (bisoxazoline)Cu($OTf)_2$, (bisoxazoline)Mg($OTf)_2$, (bisoxazoline)Zn($OTf)_2$, (bisoxazoline)Cu($SbF_6)_2$, and (bisoxazoline)PdCl($CH_3$) [$ML_2X_2$]; [PdCl($C_3H_5$)]$_2$, $CuAlCl_4$ [$M_2X_4$]; [RhCl(CO)$_2$]$_2$ [$M_2L_4X_2$]; $Al_2Cl_7^-BMIM^+$ [$M_2X_7Y$], $CuCl_2^-BMIM^+$ [$MX_2Y$], $Cu_2Cl_3^-BMIM^+$ [$M_2X_3Y$], and [(α-diimine)-Ni($CH_2CH_2CH_2C(O)OCH_3$)]$^+$, B(3,5-$CF_3$—$C_6H_3)_4^-$ [$ML_3X_2$].

Reaction of a gas may occur directly with the metal center, through a ligand coordinated to the metal center (e.g., a functional group on the ligand), or through displacement of at least one ligand on the metal center. The properties of the donor ligands, anions and/or cations affect the physical properties of metal-based reactive compounds. Ligands and counterions are selected such that volatility is minimized, and so that the steric and electronic properties of the reactive compound are suitable for reversibly binding the desired gas.

Lewis acidic reactive compounds also include polymers, oligomers, and organic compounds containing Brønsted acid groups, e.g. carboxylic acid and sulfonic acid groups. Examples include ion exchange resins, e.g. polymeric sulfonic, perfluoroalkylsulfonic, and fluorinated sulfonic acids, cross-linked sulfonated polystyrene-divinylbenzene copolymers; poly(ethylene oxide)sulfonic acid, ptoluene sulfonic acid, dodecylbenzene sulfonic acid, dodecylsulfonic acid, benzoic acid, dimethylpropionic acid, dimethylolpropionic acid, dimethylolbutanoic acid, dialkyl sulfosuccinic acid etc. Some compounds may suffer from excessive volatility at elevated temperatures and are not suited for thermal-mediated evolution. However, they may be suited for pressure-mediated evolution.

Gases having Lewis basicity to be stored and delivered from a liquid incorporating a reactive compound having Lewis acidity may comprise one or more hydride gases, e.g., phosphine, arsine, stibine, and ammonia; hydrogen sulfide, hydrogen selenide, hydrogen telluride, isotopically-enriched analogs, basic organic or organometallic compounds, etc.

The reactive compound should be dispersed throughout the liquid medium to achieve optimum capacities for gas storage. Some of the reactive compounds may be solid and at least partially insoluble in the liquid medium. To facilitate the incorporation of the reactive compound in the liquid medium, if not soluble, it may be emulsified, stabilized with surfactants, or cosolvents may be added.

The reactive compound should be incorporated in the liquid medium in an amount sufficient to meet preselected capacity and delivery requirements of the system. In the context of the liquid carrier, a molar ratio of at least about 0.3 moles reactive compound per 1000 mL of liquid is generally acceptable.

To provide an understanding of the concepts disclosed herein the following are relevant definitions to the process:

Definitions:

Total Capacity (or Capacity): Moles of gas that will react with one liter of a reactive liquid medium at a given temperature and pressure.

Working Capacity ($C_W$): Moles of gas per liter of a reactive liquid medium which is initially stored and is subsequently removable from the mixture during the dispensing operation, specified for a given temperature and pressure range, typically at 20 to 50° C. over the pressure range 20 to 760 Torr.

$C_w$=(moles of reacted gas−moles of gas remaining after delivery)/(liters of reactive liquid medium)

Percent Reversibility: Percentage of gas initially reacted with the reactive compound which is subsequently removable by pressure differential, specified for a given temperature and pressure range, typically at 20 to 50° C. over the pressure range 20 to 760 Torr.

% Reversibility=[(moles of reacted gas−moles of gas remaining after delivery)/(moles of initially reacted gas)] *100

It has been found that good Lewis acid/base systems can be established from the Gibbs free energy of reaction ($\Delta G_{rxn}$) for a given system. In a storage and delivery system based upon a reactive mixture and a gas having Lewis basicity, an operable $\Delta G_{rxn}$ range exists for operable temperature and pressure and is from about 1.3 to about −4.5 kcal/mole. There also exists an optimum $\Delta G_{rxn}$ for a given temperature and pressure range, which corresponds to a maximum working capacity for the mixture. In reference to the gas $PH_3$, if the magnitude of $\Delta G_{rxn}$ (and thus, $K_{eq}$) is too small, the reactive mixture will have insufficient capacity for $PH_3$. This insufficient capacity may be compensated for by selecting a reactive mixture with a higher total capacity (i.e. higher concentration of $PH_3$ reactive groups). If the magnitude of $\Delta G_{rxn}$ (and thus, $K_{eq}$) is too large, an insufficient amount of $PH_3$ will be removable at the desired delivery temperature. For the reaction of $PH_3$ with a Lewis acidic group, A, at 25° C. and in the pressure range 20 to 760 Torr, the optimum value range for $\Delta G_{rxn}$ is about from −0.5 to −1.6 kcal/mol. For all systems in solution involving the reaction of a single equivalent of gas with a single equivalent of Lewis acid/base group, the optimum $\Delta G_{rxn}$ will be about −1.1 kcal/mol at 25° C. and between 20 to 760 Torr. The situation is more complex for other systems, e.g., if the gas and Lewis acid/base group react to give a solid complex, or if more than one equivalent of a gas reacts with a single equivalent of a Lewis acid/base group.

One of the difficulties in the development of a suitable storage and delivery system is the matching of a suitable reactive mixture with a suitable gas through prediction of the $\Delta G_{rxn}$. To minimize experimentation and project the viability of possible systems, quantum mechanical methods can be used to elucidate molecular structures. Density Functional Theory (DFT) is a popular ab initio method that can be used to determine a theoretical value for the change in electronic energy for a given reaction ($\Delta E_{rxn}$=sum of $E_{products}$−sum of $E_{reactants}$). The following is a discussion for this determination. The calculations are assumed to have an error of approximately ±3 kcal/mol.

The reaction of one equivalent of $PH_3$ gas with one equivalent of a Lewis acid acceptor (A) in the liquid phase to give a reaction product in the liquid phase is represented by the equations:

$$PH_3(gas) \underset{}{\overset{K_1}{\rightleftharpoons}} PH_3(soln) \quad \text{(Equation 1)}$$

$$A + PH_3(soln) \overset{K_2}{\rightleftharpoons} A\text{-}PH_3$$

$$A + PH_3(gas) \overset{K_{eq}}{\rightleftharpoons} A\text{-}PH_3$$

$$K_{eq} = K_1 K_2 = \frac{[A\text{-}PH_3]}{[A][PH_3(gas)]}$$

The equilibrium constant for this reaction, $K_{eq}$, is described by equation 1, where [$PH_3$(gas)] is expressed as the pressure of gaseous $PH_3$ in atmospheres. $K_{eq}$ is dependent upon the change in Gibbs free energy for the reaction, $\Delta G_{rxn}$, which is a measure of the binding affinity between $PH_3$ and A. The relationships between ΔG, K, and temperature (in Kelvin) are given in equations 2 and 3.

$$\Delta G = \Delta H - T\Delta S \quad \text{(Equation 2)}$$

$$\Delta G = -RT\ln K \quad \text{(Equation 3)}$$

The value $\Delta E_{rxn}$ can be used as an approximate value for the change in enthalpy (ΔH, see equation 2). Also, if it is assumed that the reaction entropy (ΔS) is about the same for similar reactions, e.g., reversible reactions under the same temperature and pressure conditions, the values calculated for $\Delta E_{rxn}$ can be used to compare against $\Delta G_{rxn}$ for those reactions on a relative basis, i.e., $\Delta G_{rxn}$ is approximately proportional to $\Delta E_{rxn}$. Thus, the values calculated for $\Delta E_{rxn}$ can be used to help predict reactive groups or compounds having the appropriate reactivity for a given gas.

The following examples are intended to illustrate various embodiments of the invention and are not intended to restrict the scope thereof.

EXAMPLES

General Experimental Procedure

The following is a general procedure for establishing the effectiveness of reactive liquid mixtures for storing and delivering gases in the examples. $PH_3$ has been used as the descriptive gas for chemical reaction.

In a glove box, a 25 mL or 50 mL stainless steel reactor or 25 mL glass reactor was charged with a known quantity of a liquid mixture. The reactor was sealed, brought out of the glove box, and connected to an apparatus comprising a pressurized cylinder of pure $PH_3$, a stainless steel ballast, and a vacuum pump vented to a vessel containing a $PH_3$ scavenging material. The gas regulator was closed and the experimental apparatus was evacuated up to the regulator. Helium pycnometry was used to measure ballast, piping and reactor headspace volumes for subsequent calculations. The apparatus was again evacuated and closed off to vacuum. The following steps were used to introduce $PH_3$ to the reactor in increments: 1) the reactor was isolated by closing a valve leading to the ballast, 2) $PH_3$ was added to the ballast (ca. 800 Torr) via a mass flow controller, 3) the reactor valve was opened and the gas pressure was allowed to equilibrate while the reactor contents were stirred. These steps were repeated until the desired equilibrium vapor pressure was obtained. The quantity of $PH_3$ added in each increment was measured by pressure and volume difference according to the ideal gas law. The amount of reacted $PH_3$ was determined by subtracting tubing and reactor headspace volumes.

Example 1

Comparative

$BMIM^+Cu_2Cl_3^-$ (1), Lewis Acidic Ionic Liquid

No Reactive Compound

The purpose of this example is to provide a control. No reactive compound was used in combination with the Lewis acidic ionic liquid.

Molecular modeling was used to approximate the effectiveness of $BMIM^+Cu_2Cl_3^-$ as a reactive liquid. The ionic liquid was modeled as an ion-pair, using 1,3-dimethylimidazolium as the cation, $Cu_2Cl_3^-$ as the anion, and it was assumed that one equivalent of $PH_3$ reacted with each equivalent of copper (concentration of Cu reactive groups=9.7 mol/L). Structures were calculated using Spartan SGI Version 5.1.3 based on Density Functional Theory (DFT) with minimum energy geometry optimization at the BP level with a double numerical (DN**) basis set. This Lewis acidic ionic liquid was calculated to have an average $\Delta E_{rxn}$ of −5.5 kcal/mol for its reaction with $PH_3$. Since $\Delta G_{rxn}$ is of higher energy than $\Delta E_{rxn}$ and the optimum $\Delta G_{rxn}$ for the pressure range 20 to 760 Torr at room temperature is ca. −1.1 kcal/mol, the result suggests that the binding properties of $BMIM^+Cu_2Cl_3^-$ may be well suited for reversibly reacting with $PH_3$ (i.e., high working capacity and high % reversibility).

In a glove box, 11.6 g of CuCl was slowly added to a round bottom flask charged with 10.2 g of $BMIM^+Cl^-$(2:1 stoichiometry). (It is assumed the anion $Cu_2Cl_3^-$ is formed from the reaction stoichiometry 2 equivalents CuCl to 1 equivalent $BMIM^+Cl^-$). The mixture was stirred overnight. A glass insert was charged with 12.02 g of the ionic liquid (density=1.8 g/mL) and placed into a 50 mL reactor, and the general procedure for measuring $PH_3$ reaction was followed. The ionic liquid reacted with 51 mmol of $PH_3$ at room temperature and 736 Torr, corresponding to 7.6 mol $PH_3$/L of ionic liquid.

The results show % reversibility=84%, working capacity=6.4 mol/L (room temperature, 20-736 Torr). The experimental $\Delta G_{rxn}$, is approximately −0.7 kcal/mol at 22° C. This example represents a pure liquid-based system that is well matched, as calculated by $\Delta E_{rxn}$ and measured by $\Delta G_{rxn}$ for reversibly binding $PH_3$.

Example 2

Comparative

$TiCl_4$ (2), Volatile Lewis Acidic Liquid for $PH_3$

No Reactive Compound

The purpose of this example was to provide a second control using a reactive liquid in the absence of a Lewis Acid reactive compound.

A 50 mL reactor was charged with 12.56 g of $TiCl_4$ (liquid, density=1.73 g/mol), the reactor was cooled to ca. 7° C. in and ice bath, and the general procedure for measuring $PH_3$ reaction was followed. The liquid reacted with 100.3 mmol of $PH_3$, corresponding to 13.8 mol $PH_3$/L of $TiCl_4$ at an equilibrium vapor pressure of 428 Torr and a temperature of 12° C. A bright yellow solid results upon reaction of $PH_3$ with liquid $TiCl_4$. As a result, the isotherm for this reaction is an S shape rather than a conventional Langmuir isotherm.

The results show % reversibility=41%, working capacity=5.6 mol/L (12° C., 44-428 Torr). The delivered gas, because of the high vapor pressure of the $TiCl_4$, is contaminated with the volatile titanium complexes and would require scrubbing prior to use.

Example 3

Molecular Modeling

Molecular modeling was used to help predict potentially useful titanium compounds for reversibly binding $PH_3$ based on comparison with the systems of Examples 1 and 2 above. Structures were determined using the DFT method described above (Spartan SGI Version 5.1.3, minimum energy geometry optimization, BP level, double numerical (DN**) basis set). The results are listed in Table 1. Most of the modeled compounds were predicted to react with 2 equivalents of $PH_3$ (2 available coordination sites), in which case a value for $\Delta E_{rxn}$ was calculated for the first ($\Delta E_1$) and second ($\Delta E_2$) reaction. If the first reaction was calculated to be unfavorable, the second reaction was calculated to determine if favorable. For compounds containing only 1 coordination site, a value does not exist for $\Delta E_2$ (N/R).

TABLE 1

Results from DFT Molecular Modeling - Reaction of Lewis Acids with $PH_3$.

| | Compound | $\Delta E_1$ (kcal/mol) | $\Delta E_2$ (kcal/mol) |
|---|---|---|---|
| 1 | $BMIM^+Cu_2Cl_3^-$ | −5.16 | −5.76 |
| 2 | $TiCl_4$ | −3.34 | −2.13 |
| 3 | $TiCl_3(OCH_2CH_3)$ | −2.21 | 1.03 |
| 4 | $TiCl_3(OCH_2CF_3)$ | −3.51 | −1.01 |
| 5 | $TiCl_2(OCH_2CF_3)_2$ | −3.67 | −0.07 |
| 6 | $TiCl_3(OCH(CF_3)_2)$ | 0.11 | N/R |
| 7 | (Cyclopentadienyl)$TiCl_3$ | 3.44 | N/R |
| 8 | (Pentafluorocyclopentadienyl)$TiCl_3$ | −0.69 | 0.22 |
| 9 | $TiCl_3$(phenoxide) | −3.79 | −0.06 |
| 10 | $TiCl_3$(pentafluorophenoxide) | −4.75 | 0.32 |
| 11 | $TiCl_3$(4-nitrophenoxide) | −5.46 | −0.54 |
| 12 | $TiCl_3$(2-phenyliminomethylphenoxide) | −2.22 | N/R |
| 13 | $TiCl_3$(4-Nitro-2-phenyliminomethylphenoxide) | −4.39 | N/R |
| 14 | $TiCl_3$(2-[(2,6-diisopropylphenylimino)-methyl]phenoxide) | −5.86 | N/R |

Structures for compounds 5, 11 and 14 are shown below:

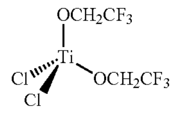

5 - $TiCl_2(OCH_2CF_3)_2$

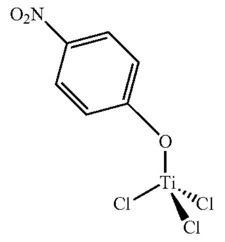

11 - $TiCl_3$(4-nitrophenoxide)

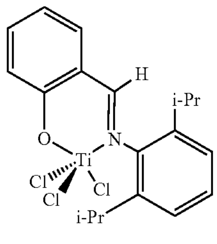

14 - $TiCl_3$(2-[(2,6-diisopropyl-phenylimino)methyl]phenoxide)

As illustrated in Examples 4-8, and as summarized in Table 2, compounds 5, 11, and 14 were tested to determine if they react with $PH_3$.

Example 4

Comparative

$TiCl_2(OCH_2CF_3)_2$ (5) Solid

Reactive Compound—No Liquid Carrier

The purpose of this example was to determine the effect of Compound 5 in the absence of a liquid carrier.

Compound 5 was synthesized under nitrogen using standard Schlenk techniques. A 100 mL round bottom Schlenk flask was charged with a magnetic stir bar and 6.84 g (0.069 mol) of $CF_3CH_2OH$. Nitrogen was bubbled through the liquid to ensure that it was deoxygenated and 5 mL of toluene was added. In a glove box, an addition funnel was charged with 13.15 g of $TiCl_4$ (0.069 mol). The addition funnel was brought out of the glove box and attached to the Schlenk flask containing the solution of $CF_3CH_2OH$. The $TiCl_4$ was added dropwise to the alcohol with stirring to give a red solution. The mixture was heated to toluene reflux for ~2 hours and allowed to cool overnight. No crystallization occurred upon cooling in an ice bath, so the mixture was heated to toluene reflux for an additional 6 hours, cooled to room temperature and was allowed to stand for 4 days. The flask was evacuated to remove the volatile components, leaving a dark yellow solid. The solid was washed with ~7 mL of toluene, the toluene was removed via cannula filtration, and the product was dried under vacuum. The product was washed with 8 mL of pentane, isolated via cannula filtration, and dried under vacuum to give 8.55 g of an off-white powder. Elemental analysis indicated that the isolated solid was 5. Anal. Calc. for $C_4H_4Cl_2F_6O_2Ti$: C, 15.16; H, 1.27; Cl, 22.38. Found: C, 14.54; H, 1.44; Cl, 22.56.

A 50 mL reactor was charged with 1.98 g of compound 5, and the general procedure for measuring $PH_3$ reaction was followed. The solid reacted with 0.19 mmol of $PH_3$, corresponding to 0.096 mmol $PH_3$/g of 5 at room temperature and an equilibrium vapor pressure of 476 Torr.

Example 5

$TiCl_2(OCH_2CF_3)_2$ (5) Dissolved in $BMIM^+BF_4^-$

Reactive Compound in Liquid Carrier

This example is similar to Example 4 except the reactive compound is dissolved in a liquid carrier.

In a glove box, 1.31 g of $BMIM^+BF_4^-$ was added to 0.91 g of 5 to give a yellow solution (estimated density=1.3 g/mL). A 50 mL reactor was charged with the solution, and the general procedure for measuring $PH_3$ reaction was followed. To increase the rate of reaction, the reactor was heated to 56° C. The solution reacted with 0.55 mmol of $PH_3$, corresponding to 0.32 mol $PH_3$/L of solution and 0.18 mol $PH_3$/mol Ti compound at 56° C. and 290 Torr.

The results show a significant improvement in the $PH_3$ capacity of compound 5 compared to the process in Example 4.

Example 6

Comparative

$TiCl_3$(4-nitrophenoxide) (11) Solid

Reactive Compound—No Liquid Carrier

Compound 11 was synthesized under nitrogen using standard Schlenk techniques. A 250 mL round bottom Schlenk flask was charged with a magnetic stir bar, 3.16 g of 4-nitrophenol (0.023 mol), and 35 g of toluene (4-nitrophenol did not dissolve in toluene). In a glove box, an addition funnel was charged with 4.53 g of $TiCl_4$ (0.023 mol) and 46 g of toluene. The addition funnel was brought out of the glove box and attached to the Schlenk flask containing the slurry of 4-nitrophenol. The $TiCl_4$ solution was added dropwise to the stirring mixture of 4-nitrophenol to give a dark red suspension. The mixture was heated to toluene reflux for ~3 hours and allowed to cool overnight. 30 mL of methylene chloride was added and the mixture was heated to $CH_2Cl_2$ reflux with stirring for 2.5 hours. The mixture was cooled, and the solid was isolated via cannula filtration and dried under vacuum for 3 days. Elemental analysis of the rust colored product was consistent with 11. Anal. Calc. for C6H4Cl3NO3Ti: C, 24.65; H, 1.38; Cl, 36.38; N, 4.79. Found: C, 26.28; H, 1.87; Cl, 32.73; N, 4.86.

A 50 mL reactor was charged with 1.23 g of compound 11, and the general procedure for measuring $PH_3$ reaction was followed. The solid reacted with 0.10 mmol of $PH_3$, corresponding to 0.081 mmol $PH_3$/g of 11 at room temperature and an equilibrium vapor pressure of 110 Torr.

Example 7

$TiCl_3$(4-nitrophenoxide) (11) Dissolved in $EMIM^+$ $BF_4^-$

Reactive Compound in Liquid Carrier

This example is similar to Example 6 except the reactive compound is dissolved in a liquid carrier.

In a glove box, 0.64 g of compound 11 was added to a vial containing 3.71 g of 1-ethyl-3-methylimidazolium ($EMIM^+$) $BF_4^-$. The solid titanium compound appeared to be completely dissolved in the ionic liquid. The reactor was charged with 3.88 g of the solution (estimated density=1.4 g/mL) and the general procedure for measuring $PH_3$ reaction was followed. To increase the rate of reaction, the reactor was heated to 51° C. The solution reacted with 0.98 mmol of $PH_3$, corresponding to 0.35 mol $PH_3$/L of solution and 0.6 mol $PH_3$/mol Ti compound at 51° C. and 520 Torr.

The results show a much higher $PH_3$ capacity for compound 11 when the reactive compound is dissolved in a liquid carrier.

Example 8

$TiCl_3$(2-[(2,6-diisopropylphenylimino)methyl]phenoxide) (14) mixed in $BMIM^+BF_4^-$ Synthesis of ligand 2-[(2,6-diisopropylphenylimino)methyl]phenol: a 100 mL round bottom flask containing a magnetic stir bar was charged with 5.24 g of 2-hydroxybenzaldehyde (0.0429 mol), 25 mL of methanol, 8.40 g of 2,6-diisopropylaniline (0.0474 mol), and 1 mL of formic acid. The reaction was stirred overnight and the resulting solid was filtered and washed with methanol. The isolated solid was dissolved in methylene chloride and dried over magnesium sulfate. The product was crystallized from methylene chloride/methanol, isolated via cannula filtration, and dried under vacuum.

Compound 14 was synthesized under nitrogen using standard Schlenk techniques. In a glove box, a 250 mL round bottom Schlenk flask was charged with a magnetic stir bar, 9.06 g of 2-[(2,6-diisopropylphenylimino)methyl]phenol (0.032 mol), and 20 mL of toluene (ligand dissolved in toluene). In a glove box, a 100 mL round bottom Schlenk flask was charged with 6.74 g of $TiCl_4$ (0.036 mol) and 20 mL of toluene. The $TiCl_4$ solution was added to the stirring mixture of 2-[(2,6-diisopropylphenylimino)methyl]phenol via cannula to give a dark brown solution. The mixture was heated to toluene reflux for 4 hours and allowed to cool. A solid precipitated from solution and this was isolated via cannula filtration, washed with pentane, and dried under vacuum. The dried product was a purple powder.

In a glove box, 0.50 g of compound 14 was added to a glass reactor insert containing 3.0 g of $BMIM^+BF_4^-$. The solid titanium compound was partly dissolved in the ionic liquid, but some portion of the solid settled out upon standing over a period of days. The glass insert containing 3.5 g of the mixture (estimated density=1.4 g/mL) was placed into a 50 mL reactor and the general procedure for measuring $PH_3$ reaction was followed. The mixture reacted with 1.15 mmol of $PH_3$, corresponding to 0.46 mol $PH_3$/L of mixture and 1 mol $PH_3$/mol Ti compound at room temperature and 404 Torr.

TABLE 2

Summary of $PH_3$ Reactions with Ti Compounds.

| Compound | Concentration | Capacity | Conditions | % Ti Reacted |
|---|---|---|---|---|
| 5 | Solid | <0.1 mmol/g | 476 Torr, RT | 2 |
| 11 | Solid | <0.1 mmol/g | 110 Torr, RT | 2 |
| 5 | 41 wt %/ $BMIM^+BF_4^-$ | 0.32 mol/L | 290 Torr, 56° C. | 18 |
| 11 | 15 wt %/ $EMIM^+BF_4^-$ | 0.35 mol/L | 520 Torr, 51° C. | 60 |
| 14 | 14 wt %/ $BMIM^+BF_4^-$ | 0.46 mol/L | 404 Torr, RT | 100 |

The above results in the table show that a significantly higher level of Ti reaction can be achieved when the respective compound is carried in a liquid carrier. It should be noted that compound 5 had the lowest calculated $\Delta E_1$ of compounds 5, 11 and 14, and compound 14 had the highest calculated $\Delta E_1$.

Example 9

Comparative

$BMIM^+BF_4^-$, Ionic Liquid Carrier

This example is similar to Example 8 except there is no reactive compound dispersed in a liquid carrier. The purpose was to determine whether the ionic liquid carriers in Examples 5, 7 and 8 react with $PH_3$ gas.

A 50 mL reactor was charged with 3.99 g of $BMIM^+BF_4^-$ and the general procedure for measuring $PH_3$ reaction was followed. The ionic liquid is not Lewis acidic and it does not react with the Lewis basic $PH_3$, demonstrating that a Lewis acidic species in the carrier, as described in Examples 6-8, must be present for reaction with $PH_3$.

The invention claimed is:

1. A process for storage and delivery of a gas, within a storage and delivery system comprised of a vessel containing a medium capable of storing a gas, and permitting delivery of said gas stored in said medium from said vessel, the improvement which comprises:

storing a gas having Lewis basicity in a reversibly reacted state within a liquid medium incorporating a liquid carrier and a reactive compound having Lewis acidity.

2. The process of claim 1 wherein the liquid carrier has a vapor pressure below about $10^{-2}$ Torr at 25° C.

3. The process of claim 1 wherein at least 50% of the stored gas is removable within a working pressure range of from 20 to 760 Torr at a temperature from 20 to 50° C.

4. The process of claim 1 wherein the liquid medium is an ionic liquid.

5. The process of claim 4 wherein the Lewis basic gas is selected from the group consisting of phosphine, arsine, stibine, ammonia, hydrogen sulfide, hydrogen selenide, hydrogen telluride, and isotopically-enriched analogs.

6. The process of claim 5 wherein the ionic liquid is comprised of a salt of a tetraalkylphosphonium, tetraalkylammonium, N-alkylpyridinium, N,N'-dialkylimidazolium, pyridazinium, pyrimidinium, pyrazinium, pyrazolium, triazolium, thiazolium, or oxazolium cation.

7. The process of claim 6 wherein the reactive compound has a vapor pressure below about $10^{-2}$ Torr at 25° C.

8. The process of claim 6 wherein the reactive compound is described by the empirical formula $M_aL_bX_cY_d$ where M represents one or more metals selected from the group consisting of alkaline earth (IUPAC Group 2), transition (IUPAC Group 3 through 11) and metals 12-15; L is a neutral donor ligand, X represents an anion that is either covalently bound to a metal or dissociates to form a counterion to a metal cation, and which may be combined with at least one donor ligand, L and/or cation Y; Y represents a cation that dissociates to form a counterion to a metal anion, and which may be combined with at least one donor ligand, and L and/or anion, X.

9. The process of claim 8 wherein the metal, M, is selected from the group consisting of Cu, Ag, Al, B, Sn, Ti, Zn, Fe, Ni, Pd, Pt, Mn, Ca, Ga, As, Sb, In, Nb, Mg, Sc, Zr, Co, Ru, and V.

10. The process of claim 9 wherein the donor ligand, L, is selected from the group consisting of amines, imines, nitriles, phosphines, phosphites, ethers, aldehyes, ketones thioethers, olefins, diolefins, and aromatics.

11. The process of claim 10 wherein the donor ligand, L, is selected from the group consisting of $NH_3$, $RNH_2$, $R_2NH$, $NR_3$, $R_2C{=}N{-}R$, N≡CR, $PH_3$, $RPH_2$, $R_2PH$, $PR_3$, $P(OR)_3$, $OR_2$, $SR_2$, CO, RCH(O), $R_2C{=}O$, cyclooctadiene, benzene, where R is alkyl, cycloalkyl, aryl, alkoxy, aryloxy, haloalkyl, haloalkoxy, or polymer.

12. The process of claim 9 wherein the anion X is selected from the group consisting of halides, alkyls, alkoxides, aryls, aryloxides, alkylates, cyclopentadienyls, acetylacetonoates, amides, sulfonates, sulfates, borates, aluminates, aluminoxides, phosphates and arsenates.

13. The process of claim 12 wherein the anion X is selected from the group consisting of $F^-$, Cl, $Br^-$, $I^-$, $R^-$, $RO^-$, cyclopentadienyl (Cp), pentamethylcyclopentadienyl, $R_2N^-$, acetylacetonoate (acac), hexafluoroacetylacetonoate (hfac), $CF_3SO_2O^-$ ($^-$OTf), $RSO_2O^-$, $ROSO_2O^-$, $BF_4^-$, $BR_4^-$, $AlCl_4^-$, $PF_6^-$, $PR_3F_3^-$, $AsF_6^-$, $NO_3^-$, $SO_4^-$, where R is alkyl, cycloalkyl, aryl, alkoxy, aryloxy, haloalkyl, haloalkoxy and polymer.

14. The process of claim 6 wherein the reactive compound is represented by the formula MX and the reactive compound is selected from the group consisting of AgCl, AgBr, AgI, $Ag(BF_4)$, Ag(OTf), $Ag(NO_3)$, CuCl, CuBr, CuI, CuCN, Cu(OTf), $Cu(PF_6)$, $Cu(AsF_6)$, Cu(acac), $Cu(O_2CCH_3)$, $Cu(O_2CCF_3)$, and $Cu[N(SO_2CF_3)_2]$.

15. The process of claim 6 wherein the Lewis acidic reactive compound is represented by the formula $MX_2$ and is selected from the group consisting of $CuCl_2$, $Cu(BF_4)_2$, $Cu(OTf)_2$, $SnCl_2$, $ZnCl_2$, $NiCl_2$, $MgCl_2$, $Mg(CH_2SCH_3)_2$, $CaCl_2$, $MnCl_2$, $Ca(OTf)_2$, $PdCl_2$, $Pd(CN)_2$, $(Cp)_2Os$, and $(Cp)_2Ru$.

16. The process of claim 6 wherein the Lewis acidic reactive compound is represented by the formula $MX_3$ and is selected from the group consisting $AlCl_3$, $Al(OTf)_3$, $FeCl_3$, $GaCl_3$, $SbCl_3$, $InCl_3$, $La(OTf)_3$, $Sc(OTf)_3$, $Ln(OTf)_3$, $Yb(OTf)_3$, tributylborane, tributylborate, and tris(perfluorophenyl)borane.

17. The process of claim 6 wherein the Lewis acidic reactive compound is represented by the formula $MX_4$ and or $MX_5$ and is selected from the group consisting $SnCl_4$, $TiCl_4$, $ZrCl_4$, $PtCl_4$, $PtI_4$, and $TiCl_3$(4-nitrophenoxide); $SbCl_5$, and $NbCl_5$.

18. The process of claim 6 wherein the Lewis acidic reactive compounds are selected from the group consisting of $TiCl_3$($_2$-phenyliminomethyl-phenoxide); bis(dibenzylideneacetone)Pd, bis(cyclooctadiene)Pd; (bisoxazoline)Cu$(OTf)_2$, (bisoxazoline)Mg$(OTf)_2$, (bisoxazoline)Zn$(OTf)_2$, (bisoxazoline)Cu$(SbF_6)_2$, (bisoxazoline)PdCl$(CH_3)$; $[PdCl(C_3H_5)]_2$, $CuAlCl_4$; $[RhCl(CO)_2]_2$; $Al_2Cl_7^-BMIM^+$, $CuCl_2^-BMIM^+$, $Cu_2Cl_3^-BMIM^+$, and $[(\alpha\text{-diimine})\text{-Ni}(CH_2CH_2CH_2C(O)OCH_3)]^+$ $B(3,5\text{-}CF_3{-}C_6H_3)_4^-]$.

19. The process of claim 5 wherein the liquid carrier is comprised of a 1-alkyl-3-methyl imidazolium cation and $BF4^-$ anion, and the reactive compound is a titanium compound selected from the group consisting of $TiCl_3(OCH_2CH_3)$, $TiCl_3(OCH_2CF_3)$, $TiCl_2(OCH_2CF_3)_2$, $TiCl_3(OCH(CF_3)_2)$, $TiCl_3$(phenoxide), $TiCl_3$(pentafluorophenoxide), $TiCl_3$(4-nitrophenoxide), $TiCl_3$(2-phenyliminomethylphenoxide), $TiCl_3$(4-Nitro-2-phenyliminomethylphenoxide) and $TiCl_3$(2-[(2,6-diisopropylphenylimino)-methyl]phenoxide).

20. The process of claim 19 wherein the 1-alkyl-3-methyl imidazolium cation is selected from the group consisting of 1-ethyl-3-methyl imidazolium and 1-butyl-3-methyl imidazolium.

21. The process of claim 19 wherein the Lewis basic gas is selected from the group consisting of phosphine, stibine and arsine.

22. The process of claim 5 wherein the reactive compound having Lewis acidity contains Brønsted acid groups, and said reactive compound is selected from the group consisting of polymeric sulfonic, perfluoroalkylsulfonic, and fluorinated sulfonic acids, cross-linked sulfonated polystyrene-divinylbenzene copolymers; poly(ethylene oxide)sulfonic acid, p-toluene sulfonic acid, dodecylbenzene sulfonic acid, dodecylsulfonic acid, benzoic acid, dimethylpropionic acid, dimethylolpropionic acid, dimethylolbutanoic acid, and dialkyl sulfosuccinic acid.

23. The process of claim 5 wherein the ionic liquid is Lewis acidic.

24. The process of claim 6 wherein the cation of the ionic liquid is selected from the group consisting N-alkylpyridinium, tetraalkylammonium and tetraalkylphosphonium salts and the anion is selected from the group consisting of tetrafluoroborate, hexafluorophosphate, triflate, tosylate, methylsulfate, ethylsulfate, and bis(trifluoromethylsulfonyl) imide, BF4-, PF6-, CF3SO3-, p-CH3-C6H4SO3-, CH3OSO3-, CH3CH2OSO3-, and (CF3SO2)2N-].

* * * * *

UNITED STATES PATENT AND TRADEMARK OFFICE

CERTIFICATE OF CORRECTION

PATENT NO. : 7,303,607 B2
APPLICATION NO. : 10/867068
DATED : December 4, 2007
INVENTOR(S) : Daniel J. Tempel et al.

It is certified that error appears in the above-identified patent and that said Letters Patent is hereby corrected as shown below:

Column 15, Line 40

In claim 11 insert the word -- and -- before the word benzene

Signed and Sealed this

Twenty Second Day of April, 2008

JON W. DUDAS
*Director of the United States Patent and Trademark Office*